(12) United States Patent
Chen et al.

(10) Patent No.: US 8,680,831 B2
(45) Date of Patent: Mar. 25, 2014

(54) CONSTANT FREQUENCY ON-TIME CONTROL SYSTEM AND METHOD AND VOLTAGE REGULATOR USING THE SAME

(75) Inventors: An-Tung Chen, Hsinchu County (TW); Ting-Jung Tai, Hsinchu County (TW)

(73) Assignee: Richtek Technology Corp, Hsinchu County (TW)

( * ) Notice: Subject to any disclaimer, the term of this patent is extended or adjusted under 35 U.S.C. 154(b) by 223 days.

(21) Appl. No.: 13/181,686

(22) Filed: Jul. 13, 2011

(65) Prior Publication Data

US 2012/0249108 A1 Oct. 4, 2012

(30) Foreign Application Priority Data

Apr. 1, 2011 (TW) .............................. 100111622 A

(51) Int. Cl.
H02M 3/335 (2006.01)
(52) U.S. Cl.
USPC .......................................................... 323/284
(58) Field of Classification Search
USPC .......................................................... 323/284
See application file for complete search history.

(56) References Cited

U.S. PATENT DOCUMENTS

2005/0017767 A1  1/2005  Huang et al.
2008/0030181 A1*  2/2008  Liu et al. ........................ 323/283

FOREIGN PATENT DOCUMENTS

| CN | 101039070 A | 9/2007 |
| EP | 1248352 A2 | 10/2002 |
| TW | 200810359 A | 2/2008 |

* cited by examiner

Primary Examiner — Harry Behm
Assistant Examiner — Matthew Grubb
(74) Attorney, Agent, or Firm — WPAT, PC; Justin King

(57) ABSTRACT

A constant frequency ON-time control system applied to a voltage regulator is disclosed. The voltage regulator determines a time length of an input voltage inputted thereto according to an ON-time and thereby regulates an output voltage. The constant frequency ON-time control system includes a constant frequency ON-time control circuit for computing the ON-time according to a system duty cycle of the voltage regulator and a frequency setting parameter and a frequency setting parameter adjusting circuit for generating a frequency setting parameter adjust value according to an OFF-time corresponding to the ON-time and taking a result of operation between the frequency setting parameter adjust value and a preset frequency setting parameter as the frequency setting parameter. The frequency setting parameter adjusting circuit uses the frequency setting parameter adjust value to change the result of operation for varying the frequency setting parameter when the OFF-time is shorter than a reference value.

10 Claims, 4 Drawing Sheets

US 8,680,831 B2

CONSTANT FREQUENCY ON-TIME CONTROL SYSTEM AND METHOD AND VOLTAGE REGULATOR USING THE SAME

FIELD OF THE INVENTION

The present invention relates to a voltage regulator or a convertor, and more particularly to a constant frequency ON-time control system, a control method and a voltage regulator using the same.

BACKGROUND OF THE INVENTION

FIG. 1A is a schematic circuit structure diagram of a conventional constant ON-time (COT) voltage regulator. As depicted in FIG. 1A, the voltage regulator 100 comprises a feedback circuit 111, an error comparator CMP, an ON-time control circuit 113, a driver & power stage 130 and an output filter 150; herein, the error comparator CMP and the ON-time control circuit 113 together construct a constant ON-time control system. In the voltage regulator 100, the error comparator CMP is configured to compare a reference voltage $V_{REF}$ to a feedback value $V_{FB}$ of an output voltage $V_{OUT}$ provided by the feedback circuit 111, and accordingly output an output voltage logic signal COMP based on the comparing result. The ON-time control circuit 113 is configured to generate and output an OFF-time and an ON-time $T_{ON}$ according to a transition time of the voltage logic signal COMP. The driver & power stage 130 is configured to determine a time length of an input voltage $V_{IN}$ inputted to the driver & power stage 130 according to the received ON-time $T_{ON}$, thereby control an inductance current $I_L$ resulted in the output filter 150 so as to further modulate the output voltage $V_{OUT}$. FIG. 1B is a schematic circuit diagram of a power stage part 1302 of the driver & power stage 130 depicted in FIG. 1A. As mentioned above, the driver & power stage 130 is configured to generate a pulse width modulation (PWM) signal $V_{PWM}$ (not shown) according to the ON-time $T_{ON}$ thereby the ON-time and OFF-time (equal to the interval time length between two consecutive ON-time) of a transistor HS-MOS is accordingly determined by the pulse width modulation signal $V_{PWM}$. Moreover, it is indicated that the two coupled transistors HS-MOS and LS-MOS are ON alternatively.

The conventional constant ON-time control system as depicted in FIG. 1A has several advantages, such as having a simple circuit design, no need of a compensation circuit and having a quick response; however, the conventional constant ON-time control system also has disadvantages such as having a varying operation frequency manner. Today, many means are developed to make the constant ON-time control systems have a constant operation frequency manner. FIG. 2 is a schematic circuit structure diagram of a conventional constant frequency ON-time regulator 200.

As depicted in FIG. 2, the conventional constant frequency ON-time regulator 200 comprises a feedback circuit 211, an error comparator CMP, a constant frequency ON-time control circuit 213, a driver & power stage 230 and an output filter 250; herein, the error comparator CMP and the constant frequency ON-time control circuit 213 together construct a constant frequency ON-time control system. In the constant frequency ON-time regulator 200, the constant frequency ON-time control circuit 213 is configured to obtain a value (or an approximate value) of the system duty cycle Duty (i.e., the duty cycle of the pulse width modulation signal $V_{PWM}$ depicted in FIG. 1B) of the voltage regulator 200 according to the input voltage $V_{IN}$ and the output voltage $V_{OUT}$, and accordingly output a corresponding ON-time $T_{ON}$ (herein, $T_{ON}=V_{OUT}/(V_{IN} \times F_{SET0})$ or Duty$\times(1/F_{SET0})$ or Duty$\times(1/F_{SET0})$) to the driver & power stage 230 based on a preset frequency setting parameter $F_{SET0}$. Thereby, the operation frequency of the constant frequency ON-time regulator 200 is approximately modulated at a constant frequency which is corresponding to the preset frequency setting parameter $F_{SET0}$. In addition, the OFF-time is automatically determined based on the error comparator CMP comparing the reference voltage $V_{REF}$ to the feedback value $V_{FB}$ of the output voltage $V_{OUT}$.

However, in a practical circuit realization of a constant frequency ON-time regulator there is a limitation of the minimum OFF-time, which means the practical OFF-time cannot drop under a specific minimum OFF-time. Therefore, once the OFF-time, corresponding to the ON-time and generated by the constant frequency ON-time control circuit 213 as depicted in FIG. 2, is needed to be modulated shorter than the minimum OFF-time, the constant frequency ON-time control system will still maintain the OFF-time at a value of the minimum OFF-time, thereby the pulse width modulation signal $V_{PWM}$, composed by the minimum OFF-time and the ON-time $T_{ON}$ generated by the constant frequency ON-time control circuit 213, may result in an over-low output voltage $V_{OUT}$ so as unable to maintain the output voltage $V_{OUT}$ at a preset level.

SUMMARY OF THE INVENTION

Therefore, an objective of the present invention is to provide a constant frequency ON-time control system for solving a problem of having an over-low output voltage resulted by the minimum OFF-time in the prior art.

Another objective of the present invention is to provide a constant frequency ON-time control method for solving a problem of having an over-low output voltage resulted by the minimum OFF-time in the prior art.

Still another objective of the present invention is to provide a voltage regulator applied to aforementioned constant frequency ON-time control system and the aforementioned constant frequency ON-time control method.

One embodiment of the present invention discloses a constant frequency ON-time control system applied to a voltage regulator. The voltage regulator determines a time length of an input voltage inputted into the voltage regulator according to an ON-time and thereby regulating an output voltage. Specifically, the constant frequency ON-time control system comprises a constant frequency ON-time control circuit and a frequency setting parameter adjusting circuit. The constant frequency ON-time control circuit is for setting the ON-time according to a system duty cycle of the voltage regulator and a frequency setting parameter. The frequency setting parameter adjusting circuit is for generating a frequency setting parameter adjust value according to an OFF-time, which is corresponding to the ON-time and of the voltage regulator, and generating the frequency setting parameter through performing an operation on the frequency setting parameter adjust value and a preset frequency setting parameter. Herein, the frequency setting parameter adjusting circuit modulates the frequency setting parameter through changing a result of the operation based on the frequency setting parameter adjust value when the OFF-time is shorter than an OFF-time reference value, thereby increases the ON-time.

In one embodiment, the above mentioned frequency setting parameter adjusting circuit comprises an error amplifier, a low-pass filter, a polarity selection circuit and a computing circuit. The error amplifier is for outputting an error amplified signal according to a difference between a control voltage representing the OFF-time and a reference voltage representing the OFF-time reference value, wherein the error amplified signal has a specific polarity when the OFF-time is shorter than the OFF-time reference value. The low-pass filter is for outputting a low-pass filtered error amplified signal through performing a low-pass filtering operation on the error amplified signal. The polarity selection circuit is for outputting the frequency setting parameter adjust value according to the low-pass filtered error amplified signal, and adjusting the frequency setting parameter adjust value to a non-zero value when the low-pass filtered error amplified signal is with the specific polarity. The computing circuit is for generating the frequency setting parameter through computing the preset frequency setting parameter and the frequency setting parameter adjust value, and providing the frequency setting parameter to the constant frequency ON-time control circuit.

In one embodiment, the above mentioned frequency setting parameter adjusting circuit further comprises a time-to-voltage convertor for converting the OFF-time into the control voltage.

In one embodiment, the above mentioned constant frequency ON-time control system further comprises an error comparator for generating an output voltage logic signal according to a feedback value of the output voltage and a reference voltage, and providing the output voltage logic signal to the constant frequency ON-time control circuit for determining the OFF-time.

Another embodiment of the present invention discloses a constant frequency ON-time control method applied to a voltage regulator. The voltage regulator determines a time length of an input voltage inputted into the voltage regulator according to an ON-time and thereby regulating an output voltage. The constant frequency ON-time control method comprises steps of: setting the ON-time according to a system duty cycle of the voltage regulator and a frequency setting parameter; and changing the frequency setting parameter thereby increasing the ON-time when an OFF-time, corresponding to the ON-time and of the voltage regulator, is shorter than an OFF-time reference value.

In one embodiment, the above mentioned step of changing the frequency setting parameter thereby increasing the ON-time when the OFF-time, corresponding to the ON-time and of the voltage regulator, is shorter than the OFF-time reference value comprises steps of: outputting an error amplified signal according to a difference between a control voltage representing the OFF-time and a reference voltage representing the OFF-time reference value, wherein the error amplified signal has a specific polarity when the OFF-time is shorter than the OFF-time reference value; outputting a low-pass filtered error amplified signal through performing a low-pass filtering operation on the error amplified signal; outputting a frequency setting parameter adjust value with an non-zero value when the low-pass filtered error amplified signal is with the specific polarity; and changing the frequency setting parameter through the frequency setting parameter adjust value with an non-zero value.

In one embodiment, the above mentioned constant frequency ON-time control method further comprises steps of: providing an output voltage logic signal according to a difference between a feedback value of the output voltage and a reference voltage; and determining the OFF-time according to the output voltage logic signal.

Another embodiment of the present invention discloses a voltage regulator. The voltage regulator comprises a driver & power stage, a constant frequency ON-time control circuit and a frequency setting parameter adjusting circuit. The driver & power stage is for determining a time length of an input voltage inputted into the driver & power stage according to an ON-time and thereby regulating an output voltage. The constant frequency ON-time control circuit is for setting the ON-time according to a system duty cycle of the voltage regulator and a frequency setting parameter. The frequency setting parameter adjusting circuit is for generating a frequency setting parameter adjust value according to an OFF-time which is corresponding to the ON-time, and determining whether to change the frequency setting parameter according to the frequency setting parameter adjust value. Wherein, the frequency setting parameter adjust value has a non-zero value thereby the frequency setting parameter is modulated when the OFF-time is shorter than an OFF-time reference value.

In summary, through the frequency setting parameter adjusting circuit in the embodiment of the present invention, the frequency setting parameter is modulated to a smaller value thereby the ON-time is modulated for example to a larger value when the OFF-time is shorter than the OFF-time reference value (the OFF-time reference value can be set to a value larger than the minimum OFF-time in a circuit implementation), consequently the problem of resulting in decreasing output voltage due to the minimum OFF-time limitation in the prior art is solved.

BRIEF DESCRIPTION OF THE DRAWINGS

The above objects and advantages of the present invention will become more readily apparent to those ordinarily skilled in the art after reviewing the following detailed description and accompanying drawing, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
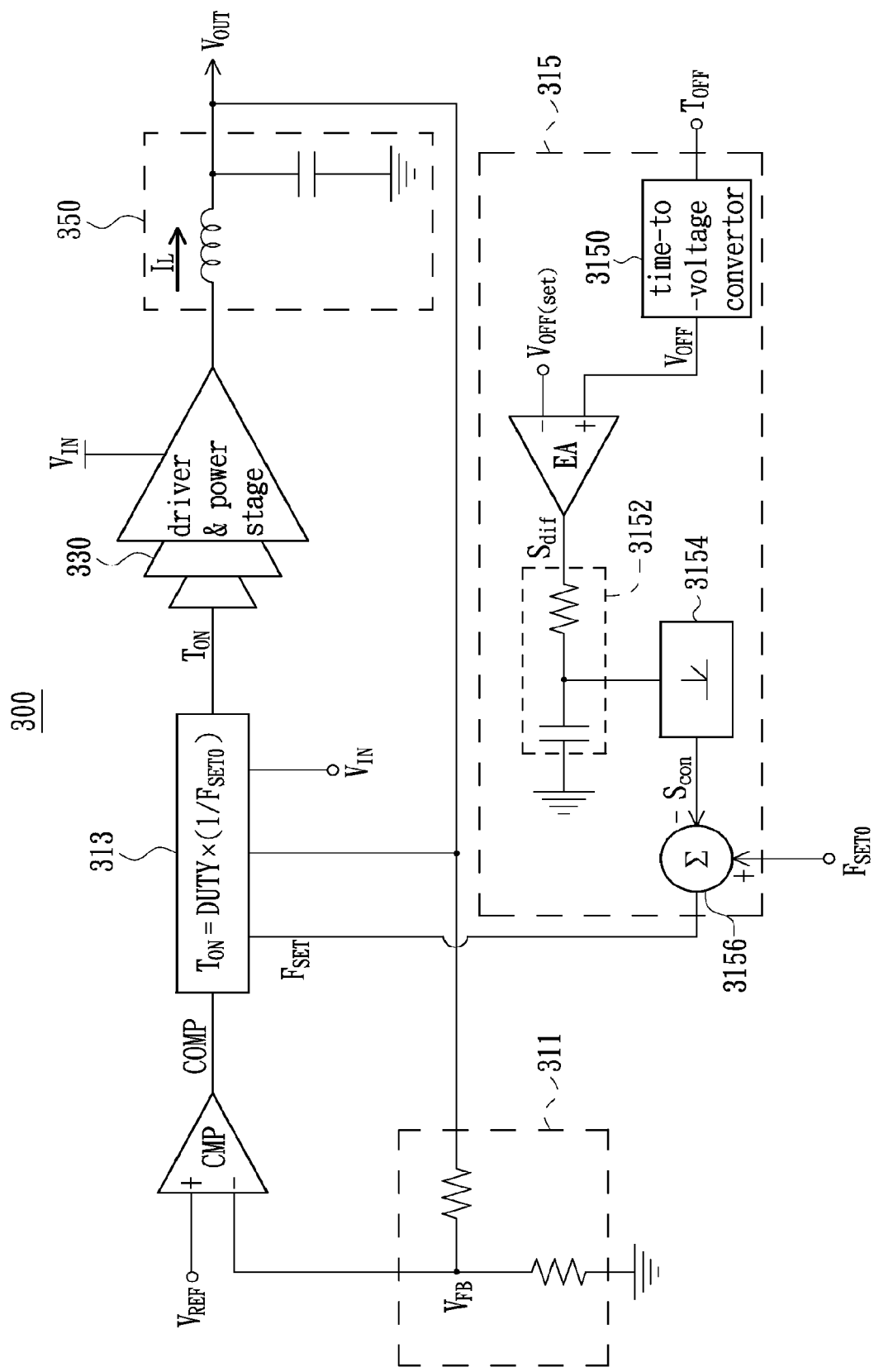
FIG. 3 is a schematic circuit structure diagram of a constant frequency ON-time voltage regulator in accordance with an embodiment of the present invention.

FIG. 3 is a schematic circuit structure diagram of a constant frequency ON-time voltage regulator in accordance with an embodiment of the present invention. As depicted in FIG. 3, the constant frequency ON-time voltage regulator 300 comprises a feedback circuit 311, an error comparator CMP, a constant frequency ON-time control circuit 313, a frequency setting parameter adjusting circuit 315, a driver & power stage 330 and an output filter 350; herein, the error comparator CMP, the constant frequency ON-time control circuit 313 and the frequency setting parameter adjusting circuit 315 together construct a constant frequency ON-time control system of the embodiment.

Figure 1A:
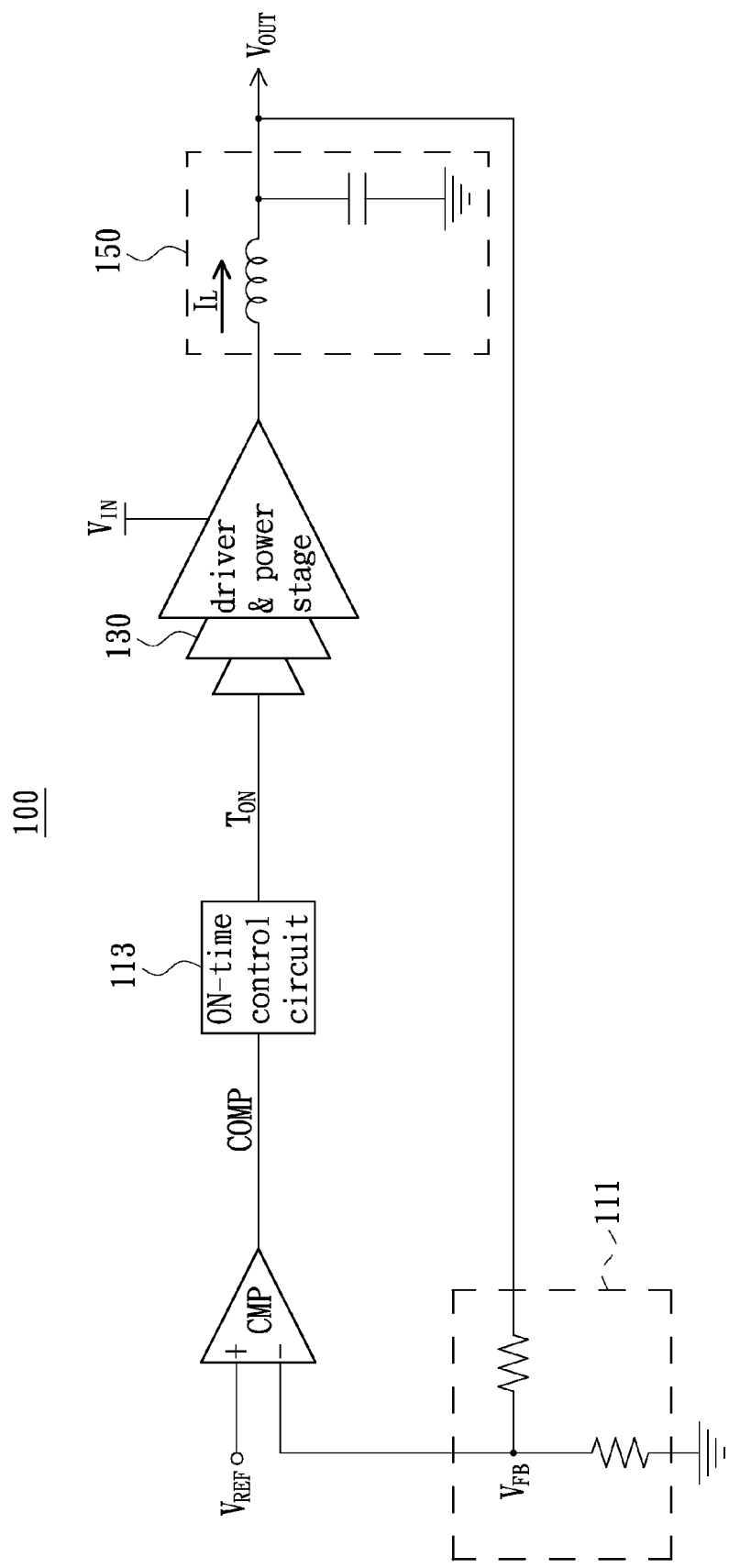
FIG. 1A is a schematic circuit structure diagram of a conventional constant ON-time (COT) voltage regulator.
Figure 2:
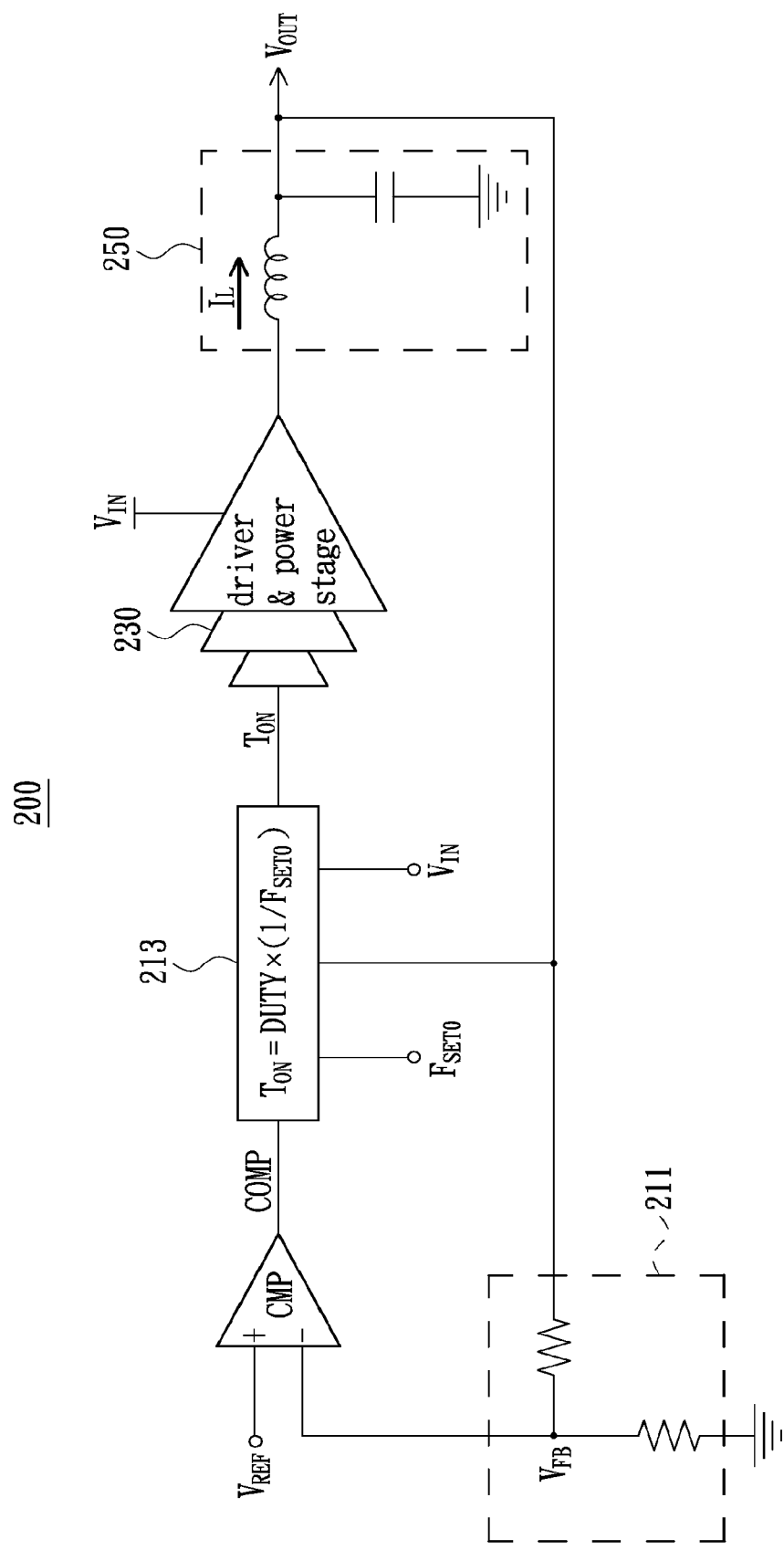
FIG. 2 is a schematic circuit structure diagram of a conventional constant frequency ON-time regulator.

In the embodiment, basically the function of the feedback circuit 311, error comparator CMP, driver & power stage 330 and output filter 350 is respectively same as that of the feedback circuit 111, error comparator CMP, driver & power stage 130 and output filter 150 depicted in FIGS. 1A and 2; thereby no any unnecessary detail is given here.

Figure 1B:
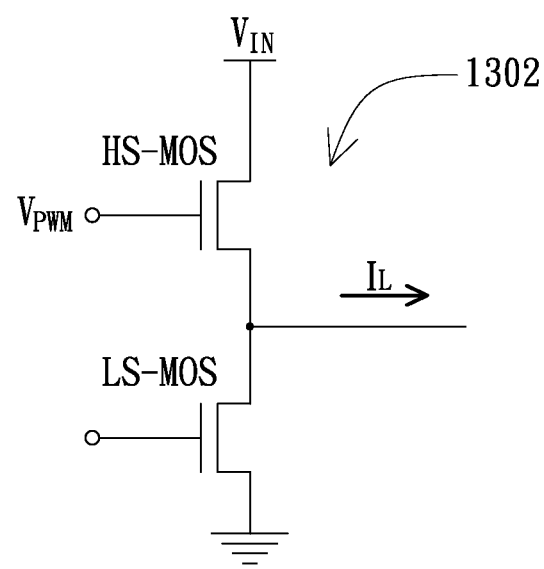
FIG. 1B is a schematic circuit diagram of a power stage part of the driver & power stage depicted in FIG. 1A.

In the voltage regulator 300 of the embodiment, the constant frequency ON-time control circuit 313 is configured to obtain a value (or an approximate value) of the system duty cycle Duty (i.e., the duty cycle of the pulse width modulation signal $V_{PWM}$ depicted in FIG. 1B) of the voltage regulator 300 according to the input voltage $V_{IN}$ and the output voltage $V_{OUT}$; accordingly generate an ON-time $T_{ON}$ based on the exemplary equation $T_{ON}=V_{OUT}/(V_{IN}\times F_{SET})$ or Duty×(1/$F_{SET}$) or Duty×(1/$F_{SET}$)), where $F_{SET}$ is the frequency setting parameter; and consequently determine an OFF-time, which is corresponding to the ON-time $T_{ON}$, according to an output voltage logic signal COMP outputted from the error comparator CMP through comparing the reference voltage $V_{REF}$ to the feedback value $V_{FB}$ of the output voltage $V_{OUT}$. It is to be indicated that the system duty cycle Duty is not necessary to be obtained through dividing the output voltage $V_{OUT}$ by the input voltage $V_{IN}$; the system duty cycle Duty can be obtained by other means. The driver & power stage 330 is configured to determine a time length of an input voltage $V_{IN}$ inputted into the driver & power stage 330 according to an ON-time $T_{ON}$ outputted from the constant frequency ON-time control circuit 313 and thereby regulate the output voltage $V_{OUT}$.

As depicted in FIG. 3, the frequency setting parameter adjusting circuit 315 comprises a time-to-voltage convertor 3150, an error amplifier EA, a low-pass filter 3152, a polarity selection circuit 3154 and a computing circuit 3156.

In the frequency setting parameter adjusting circuit 315 of the embodiment, the time-to-voltage convertor 3150 is configured to receive the OFF-time $T_{OFF}$ from the constant frequency ON-time control circuit 313 and convert the OFF-time $T_{OFF}$ into a control voltage $V_{OFF}$ which represents the OFF-time $T_{OFF}$. The error amplifier EA is configured to receive the control voltage $V_{OFF}$ and a reference voltage $V_{OFF(set)}$ which represents an OFF-time reference value (herein, the OFF-time reference value is set to a value larger than the minimum OFF-time of the system), and output an error amplified signal $S_{dif}$ according to a difference between the control voltage $V_{OFF}$ and the reference voltage $V_{OFF(set)}$. Specifically, the error amplified signal $S_{dif}$ has a positive polarity (or $S_{dif}>0$) if the control voltage $V_{OFF}$ is larger than the reference voltage $V_{OFF(set)}$ (or, the OFF-time $T_{OFF}$ is shorter than the OFF-time reference value correspondingly); otherwise, $S_{dif}\leq 0$. The low-pass filter 3152 is configured to perform a low-pass filtering operation on the error amplified signal $S_{dif}$ and accordingly output a low-pass filtered error amplified signal $S_{dif}$ to the polarity selection circuit 3154. The polarity selection circuit 3154 is configured to output the frequency setting parameter adjust value $S_{con}$ according to the low-pass filtered error amplified signal $S_{dif}$. Specifically, the polarity selection circuit 3154 sets the frequency setting parameter adjust value $S_{con}$ to an non-zero value (or, $S_{con}>0$) when the error amplified signal $S_{dif}>0$; alternatively, the polarity selection circuit 3154 sets the frequency setting parameter adjust value $S_{con}$ to zero (or, $S_{con}=0$) when the error amplified signal $S_{dif}\leq 0$. The computing circuit 3156 is configured to receive a preset frequency setting parameter $F_{SET0}$ and the frequency setting parameter adjust value $S_{con}$, and perform an operation on the preset frequency setting parameter $F_{SET0}$ and the frequency setting parameter adjust value $S_{con}$, thereby provide the result of the operation (or the frequency setting parameter $F_{SET}$) to the constant frequency ON-time control circuit 313; herein, the operation is $F_{SET}=\alpha F_{SET0}-\beta S_{con}$, and the equation has a simplest form when $\alpha=\beta=1$; however, it is noted that $\alpha$ and $\beta$ can be set to other values.

Based on the equation of $F_{SET}=\alpha F_{SET0}-\beta S_{con}$ in the embodiment, it is noted: the frequency setting parameter adjust value $S_{con}$ is modulated to an non-zero value thereby the frequency setting parameter $F_{SET}$ is accordingly modulated for example to a smaller value when the OFF-time $T_{OFF}$ is smaller than the OFF-time reference value; alternatively, the frequency setting parameter adjust value $S_{con}$ is modulated to zero thereby the frequency setting parameter $F_{SET}$ is maintained at a preset value when the OFF-time $T_{OFF}$ is not smaller than the OFF-time reference value. Consequently, the problem of resulting in an over-low output voltage due to the minimum OFF-time limitation in the prior art is avoided in the embodiment of the present.

To sum up, through the frequency setting parameter adjusting circuit in the embodiment of the present invention, the frequency setting parameter is modulated to a smaller value thereby the ON-time is modulated for example to a larger value when the OFF-time is shorter than the OFF-time reference value (the OFF-time reference value can be set to a value larger than the minimum OFF-time in a circuit implementation), consequently the problem of resulting in an over-low output voltage due to the minimum OFF-time limitation in the prior art is solved.

In addition, it is to be noted that as long as the purpose of modulating the frequency setting parameter to a smaller value is maintained when the OFF-time is shorter than the OFF-time reference value, the design of circuit structure of the voltage modulator, such as the frequency setting parameter adjusting circuit, in the embodiment can be properly modified by those ordinarily skilled in the art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A constant frequency ON-time control system applied to a voltage regulator, the voltage regulator determining a time length of an input voltage inputted into the voltage regulator according to an ON-time and thereby regulating an output voltage, the constant frequency ON-time control system comprising:

a constant frequency ON-time control circuit, for setting the ON-time according to a system duty cycle of the voltage regulator and a frequency setting parameter; and a frequency setting parameter adjusting circuit, for generating a frequency setting parameter adjust value according to an OFF-time, which is corresponding to the ON-time of the voltage regulator, and generating the frequency setting parameter through performing an operation on the frequency setting parameter adjust value and a preset frequency setting parameter, wherein, the frequency setting parameter adjusting circuit modulates the frequency setting parameter through changing a result of the operation based on the frequency setting parameter adjust value when the OFF-time is shorter than an OFF-time reference value, thereby increases the ON-time, wherein the frequency setting parameter adjusting circuit comprises:

an error amplifier, for outputting an error amplified signal according to a difference between a control voltage representing the OFF-time and a reference voltage representing the OFF-time reference value, wherein the error amplified signal has a specific polarity when the OFF-time is shorter than the OFF-time reference value;

a low-pass filter, for outputting a low-pass filtered error amplified signal through performing a low-pass filtering operation on the error amplified signal;

a polarity selection circuit, for outputting the frequency setting parameter adjust value according to the low-pass filtered error amplified signal, and adjusting the frequency setting parameter adjust value to an non-zero value when the low-pass filtered error amplified signal is with the specific polarity; and a computing circuit, for generating the frequency setting parameter through computing the preset frequency setting parameter and the frequency setting parameter adjust value, and providing the frequency setting parameter to the constant frequency ON-time control circuit.

2. The constant frequency ON-time control system according to claim 1, wherein the frequency setting parameter adjusting circuit further comprises:

a time-to-voltage convertor, for converting the OFF-time into the control voltage.

3. The constant frequency ON-time control system according to claim 1, further comprising:

an error comparator, for generating an output voltage logic signal according to a feedback value of the output voltage and a reference voltage, and providing the output voltage logic signal to the constant frequency ON-time control circuit for determining the OFF-time.

4. The constant frequency ON-time control system according to claim 1, wherein the operation is $F_{SET}=\alpha F_{SET0}-\beta S_{con}$, $F_{SET}$ represents the frequency setting parameter, $F_{SET0}$ represents the preset frequency setting parameter, $S_{con}$ represents the frequency setting parameter adjust value, $\alpha$ and $\beta$ are constants.

5. A constant frequency ON-time control method employed in a constant frequency ON-time control system according to claim 1 applied to a voltage regulator, the voltage regulator determining a time length of an input voltage inputted into the voltage regulator according to an ON-time and thereby regulating an output voltage, the constant frequency ON-time control method comprising steps of:

setting the ON-time according to a system duty cycle of the voltage regulator and a frequency setting parameter; and changing the frequency setting parameter thereby increasing the ON-time when an OFF-time, corresponding to the ON-time and of the voltage regulator, is shorter than an OFF-time reference value.

6. The method according to claim 5, wherein the step of changing the frequency setting parameter thereby increasing the ON-time when the OFF-time, corresponding to the ON-time and of the voltage regulator, is shorter than the OFF-time reference value comprises steps of:

outputting an error amplified signal according to a difference between a control voltage representing the OFF-time and a reference voltage representing the OFF-time reference value, wherein the error amplified signal has a specific polarity when the OFF-time is shorter than the OFF-time reference value;

outputting a low-pass filtered error amplified signal through performing a low-pass filtering operation on the error amplified signal;

outputting a frequency setting parameter adjust value with an non-zero value when the low-pass filtered error amplified signal is with the specific polarity; and changing the frequency setting parameter through the frequency setting parameter adjust value with a non-zero value.

7. The method according to claim 5, further comprising steps of:

providing an output voltage logic signal according to a difference between a feedback value of the output voltage and a reference voltage; and determining the OFF-time according to the output voltage logic signal.

8. A voltage regulator, comprising:

a driver & power stage, for determining a time length of an input voltage inputted into the driver & power stage according to an ON-time and thereby regulating an output voltage;

a constant frequency ON-time control circuit, for setting the ON-time according to a system duty cycle of the voltage regulator and a frequency setting parameter; and a frequency setting parameter adjusting circuit, for generating a frequency setting parameter adjust value according to an OFF-time which is corresponding to the ON-time, and determining whether to change the frequency setting parameter according to the frequency setting parameter adjust value, wherein, the frequency setting parameter adjust value has a non-zero value thereby the frequency setting parameter is modulated when the OFF-time is shorter than an OFF-time reference value, wherein the frequency setting parameter adjusting circuit comprises:

an error amplifier, for outputting an error amplified signal according to a difference between a control voltage representing the OFF-time and a reference voltage representing the OFF-time reference value, wherein the error amplified signal has a specific polarity when the OFF-time is shorter than the OFF-time reference value;

a low-pass filter, for outputting a low-pass filtered error amplified signal through performing a low-pass filtering operation on the error amplified signal;

a polarity selection circuit, for outputting the frequency setting parameter adjust value according to the low-pass filtered error amplified signal, and adjusting the frequency setting parameter adjust value to an non-zero value when the low-pass filtered error amplified signal is with the specific polarity; and a computing circuit, for generating the frequency setting parameter through computing a preset frequency setting parameter and the frequency setting parameter adjust value, and providing the frequency setting parameter to the constant frequency ON-time control circuit.

9. The voltage regulator according to claim 8, further comprising:

an error comparator, for generating an output voltage logic signal according to a feedback value of the output voltage and a reference voltage, and providing the output voltage logic signal to the constant frequency ON-time control circuit for determining the OFF-time.

10. The voltage regulator according to claim 8, wherein the system duty cycle is obtained based on the input voltage and the output voltage.

* * * * *